US012753705B2

(12) United States Patent
Guiot et al.

(10) Patent No.: US 12,753,705 B2
(45) Date of Patent: Oct. 6, 2026

(54) BEARING FOR TURBOMACHINE VARIABLE PITCH STATOR VANE PIVOT, STATOR VANE COMPRISING SUCH A BEARING AND TURBOMACHINE COMPRISING SUCH STATOR VANES

(71) Applicant: SAFRAN AIRCRAFT ENGINES, Paris (FR)

(72) Inventors: Nicolas Thibaut Guiot, Moissy-Cramayel (FR); Benoit André Pierre Frossard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/548,558

(22) PCT Filed: Feb. 23, 2022

(86) PCT No.: PCT/FR2022/050327
§ 371 (c)(1),
(2) Date: Aug. 31, 2023

(87) PCT Pub. No.: WO2022/189720
PCT Pub. Date: Sep. 15, 2022

(65) Prior Publication Data
US 2024/0151153 A1 May 9, 2024

(30) Foreign Application Priority Data
Mar. 8, 2021 (FR) ....................................... 2102218

(51) Int. Cl.
*F01D 17/16* (2006.01)
*F01D 25/06* (2006.01)
(Continued)

(52) U.S. Cl.
CPC ........... *F01D 17/16* (2013.01); *F01D 17/162* (2013.01); *F01D 25/06* (2013.01); *F01D 25/16* (2013.01);
(Continued)

(58) Field of Classification Search
CPC ........ F01D 17/162; F01D 17/16; F01D 25/04; F01D 25/06; F01D 25/162; F01D 25/164; F04D 29/563
See application file for complete search history.

(56) References Cited

U.S. PATENT DOCUMENTS 2,999,630 A * 9/1961 Robert .................. F04D 29/563
74/559
4,060,287 A * 11/1977 Orkin .................... F16C 33/208
384/208
(Continued)

FOREIGN PATENT DOCUMENTS

BE 586 659 A 5/1960
DE 954 637 C 12/1956
(Continued)

OTHER PUBLICATIONS

JP-2012246785-translation from espacenet (Year: 2012).*
HR International Search Report as issued in International Patent Application No. PCT/FR2022/050327, dated May 25, 2022.

*Primary Examiner* — Courtney D Heinle
*Assistant Examiner* — Behnoush Haghighian
(74) *Attorney, Agent, or Firm* — CUSHMAN PARTNERS, LLC

(57) ABSTRACT

A bearing for a turbomachine variable pitch stator vane pivot mounted in a bore of a casing of the turbomachine and including a bushing integral with the bore and allowing rotation of a pivot rod within the casing, and additionally a ring mounted so as to be integral with the pivot rod inside the bushing and including an outer part providing the
(Continued)

stiffening of the ring and an inner part integral with the outer part and providing a damping function.

13 Claims, 4 Drawing Sheets

(51) Int. Cl.
*F01D 25/16* (2006.01)
*F04D 29/56* (2006.01)

(52) U.S. Cl.
CPC ...... *F04D 29/563* (2013.01); *F05D 2220/323* (2013.01); *F05D 2240/128* (2013.01); *F05D 2240/50* (2013.01); *F05D 2260/96* (2013.01)

(56) References Cited

U.S. PATENT DOCUMENTS

| | | | | |
|---|---|---|---|---|
| 5,308,226 | A * | 5/1994 | Venkatasubbu | F01D 17/162 415/209.3 |
| 5,622,473 | A * | 4/1997 | Payling | F01D 17/162 415/170.1 |
| 5,807,072 | A * | 9/1998 | Payling | F01D 17/162 277/422 |
| 7,588,416 | B2 * | 9/2009 | Bouru | F16C 17/10 415/160 |
| 8,038,387 | B2 * | 10/2011 | Houradou | F04D 29/057 384/215 |
| 8,147,187 | B2 * | 4/2012 | Foucher | F02C 9/22 415/163 |
| 8,858,165 | B2 * | 10/2014 | Peck | F16C 33/04 415/168.2 |
| 9,410,443 | B2 * | 8/2016 | Dube | F01D 25/164 |
| 9,617,861 | B2 * | 4/2017 | Klaen | F01D 9/02 |
| 10,519,798 | B2 * | 12/2019 | Kennedy | F04D 29/563 |
| 10,788,048 | B2 * | 9/2020 | Kim | F01D 17/165 |
| 11,187,108 | B2 * | 11/2021 | Koletzki | F01D 9/041 |
| 11,346,235 | B2 * | 5/2022 | Stoyanov | F01D 9/042 |
| 2007/0059161 | A1 * | 3/2007 | Bouru | F16C 17/10 415/160 |
| 2008/0031730 | A1 * | 2/2008 | Houradou | F04D 29/563 415/173.2 |
| 2008/0206045 | A1 * | 8/2008 | Foucher | F01D 17/162 415/160 |
| 2013/0195651 | A1 * | 8/2013 | Dube | F01D 25/164 416/1 |
| 2016/0341068 | A1 * | 11/2016 | Robertson, Jr. | F01D 9/041 |
| 2019/0063459 | A1 * | 2/2019 | Kim | F02C 3/13 |
| 2021/0310367 | A1 * | 10/2021 | Clanahan | F16C 33/125 |

FOREIGN PATENT DOCUMENTS

| | | | |
|---|---|---|---|
| EP | 2 620 602 | A2 | 7/2013 |
| EP | 3 009 607 | A1 | 4/2016 |
| FR | 2 902 822 | A1 | 12/2007 |
| FR | 2 913 052 | A1 | 8/2008 |
| JP | 2012246785 | A * | 12/2012 |

* cited by examiner

--PRIOR ART--

BEARING FOR TURBOMACHINE VARIABLE PITCH STATOR VANE PIVOT, STATOR VANE COMPRISING SUCH A BEARING AND TURBOMACHINE COMPRISING SUCH STATOR VANES

CROSS-REFERENCE TO RELATED APPLICATIONS

This application is the U.S. National Stage of PCT/FR2022/050327, filed Feb. 23, 2022, which in turn claims priority to French patent application number 2102218 filed Mar. 8, 2021. The content of these applications are incorporated herein by reference in their entireties.

TECHNICAL FIELD OF THE INVENTION

The present invention relates to a vibration damping ring for a turbomachine variable pitch stator vane pivot. It also relates to a stator vane bearing equipped with such a ring, a stator vane equipped with this bearing and a turbomachine equipped with such variable pitch stator vanes.

The invention finds applications in the field of turbomachines such as the axial compressors of high-power engines and, in particular, in the field of variable pitch stator vanes of the machine.

TECHNOLOGICAL BACKGROUND OF THE INVENTION

It is known in aeronautics that the power of an engine can be improved by using a system of hinged vanes which can be oriented in relation to the casing of the compressor of the engine. These variable pitch stator vanes (VSV) can be pivoted during engine operation in order to adapt their action as a function of engine speed and flight conditions. Generally, these vanes are provided with control rods, pivotally mounted in openings passing through the casing of the compressor and having control levers extending therefrom.

An example of a variable pitch stator vane is represented schematically in FIG. 1. This stator vane 1, mounted in the casing 3 of the engine, comprises a blade 12, a plate or platform 13 and a rod forming a first pivot 14 at one end. The first pivot 14, or upper pivot, is housed in a bore, or radial port, provided in the inner wall of the casing 3, via different bearings. The vane 1 is held in the casing 3, at one end, by this first pivot 14 and, at its other end, by a second pivot 17, or lower pivot.

The first pivot 14 revolves in the corresponding bore of the casing 3 via bearings, for example a low bearing 4 on the platform 13 side and a high bearing 5 on the journal 15 side. The platform 13 is housed in a cavity in the form of a counterbore machined into the wall of this casing 3. The wall of the casing 3 is in radial contact with the platform 13 either directly or via a bush. The high part of the pivot 14 is retained in the high bearing 5. Bearings 4 and 5 each include a bush housed in the bore of the casing 3, the inner wall of which forms a friction surface with the pivot-forming rod 14.

The second pivot 17 is similar to the first pivot 14, except that it is mounted to the lower end of the vane 1: it is mounted aligned with the first pivot 14, within a bush 11, itself mounted in the inner shroud 19 of the casing.

The face of the platform 13, opposite to the bearing 4, forms the base of the blade and is swept by the gases moved by the compressor. This face of the platform is shaped so as to ensure continuity of the stream formed by the casing. A nut of the journal 15 holds the vane in its housing and a lever, actuated by appropriate control members, controls the rotation of the vane about the axis XX of the rod 14 to bring the same into the required position in relation to the direction of the gas flow. The relative movements of the parts with respect to each other result from the sliding of the surfaces in contact with each other.

Although high-power engines have many advantages, in particular high power, they also have the drawback of generating high vibration levels. But, these high vibration levels tend to cause cracks in the variable pitch stator vanes (VSV). These cracks generally are fissures that generally appear in the connection zones of the vane, which are called "triple connection radius zones". These triple connection radius zones, of which there are two per vane, are the zones where the radius between the platform and the lower surface of the VSV, the radius between the platform and the upper surface of the VSV and the radius between the platform and the top (or bottom) of the VSV connect. An example of the two triple connection radius zones of a VSV vane, referenced as Ztr, is represented in FIG. 2 in a front view and a rear view of a VSV vane. The cracks generated in these zones Ztr weaken the structure of the vanes, leading to the break-up of the blades 12. The latter can lead to even more severe events by releasing the part into the stream.

SUMMARY OF THE INVENTION

To address the problems discussed above of cracks generated in the triple connection radius zones due to the high vibrational levels of high-power engines, the applicant provides a damping ring designed to be mounted around the pivot of a VSV vane so as to damp the vibrations within said vane.

According to a first aspect, the invention relates to a ring for a turbomachine variable pitch stator vane pivot, including an external part ensuring rigidification of the ring and an internal part solidly connected to the external part and ensuring a damping function. Such a ring has the dual advantage of damping vibrations within the vane while facilitating rotation of the pivot.

Further to the characteristics just discussed in the preceding paragraph, the vibration damping ring according to one aspect of the invention may have one or more complementary characteristics from among the following, considered individually or according to all technically possible combinations:

- The external part includes a rigid shroud, in particular made of sheet metal, and the internal part includes a hollow cylindrical part formed of a material which is flexible in relation to the material of the rigid shroud.
- The material of the hollow cylindrical part is a viscoelastic material.
- The viscoelastic material is CNT.
- The rigid shroud is made of titanium.
- The external part and the internal part are secured by bonding or overmoulding.
- The ring includes at least one inner securing means capable of securing said damping ring to a pivot rod of the variable pitch stator vane pivot.
- The inner securing means includes at least one projecting element formed of the material of the hollow cylindrical part and extending axially over at least part of the height of said hollow cylindrical part.

A second aspect of the invention relates to a bearing for a turbomachine variable pitch stator vane pivot mounted in a bore of a casing of the turbomachine and including a bush solidly connected to said bore and allowing rotation of a pivot rod within the casing. This bearing is characterised in that it further includes a ring as defined above, solidly connected to the pivot rod inside the bush.

A third aspect of the invention relates to a turbomachine variable pitch stator vane, including a journal for fixing a rod for controlling the setting of the vane and at least one pivot rod intended to be mounted inside a casing of the turbomachine. This vane is characterised in that it further includes a bearing as defined above.

The vane according to the third aspect of the invention may have one or more complementary characteristics from among the following:

- The pivot rod includes at least one radial notch adapted to receive a projecting element of the vibration damping ring.
- The vibration damping ring includes a height between approximately the height of the bush and the height of the variable pitch stator vane pivot.

According to a fourth aspect, the invention relates to a turbomachine including stator vanes as defined above.

BRIEF DESCRIPTION OF THE FIGURES

Further advantages and characteristics of the invention will become apparent upon reading the following description, illustrated by the figures in which.

DETAILED DESCRIPTION

An example of embodiment of a vibration damping ring, configured to be mounted around a pivot of a variable pitch stator vane, is described in detail below, with reference to the appended drawings. This example illustrates the characteristics and advantages of the invention. However, it is reminded that the invention is not limited to this example.

In the figures, identical elements are marked by identical references. For reasons of legibility of the figures, the size scales between the elements represented are not respected.

Figure 1:
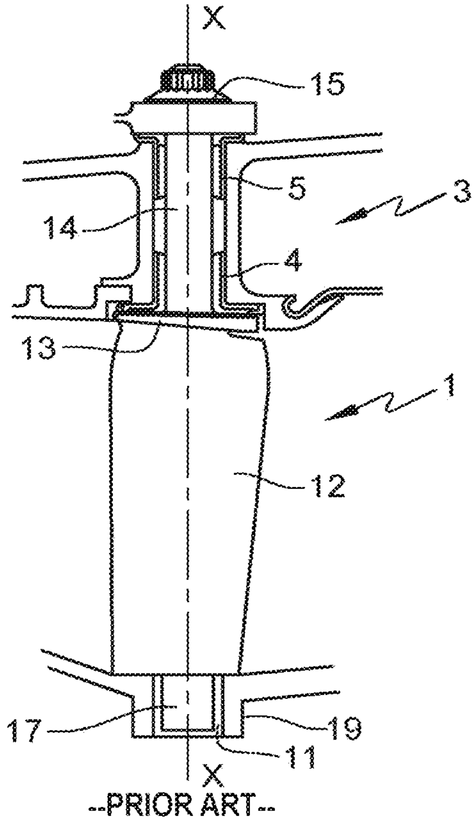
FIG. 1, already described, schematically represents an example of a variable pitch stator vane according to prior art.
Figure 2:
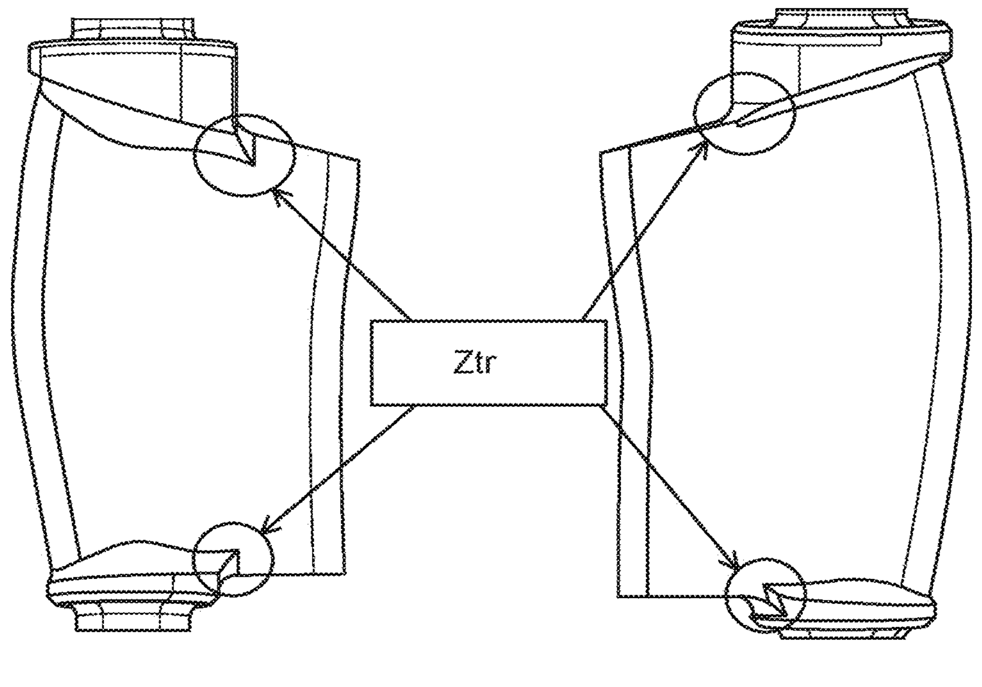
FIG. 2, already described, represents a schematic front view and a schematic rear view of the triple connection radius zones of a variable pitch stator vane, zones in which the cracks are formed.
Figure 3A:
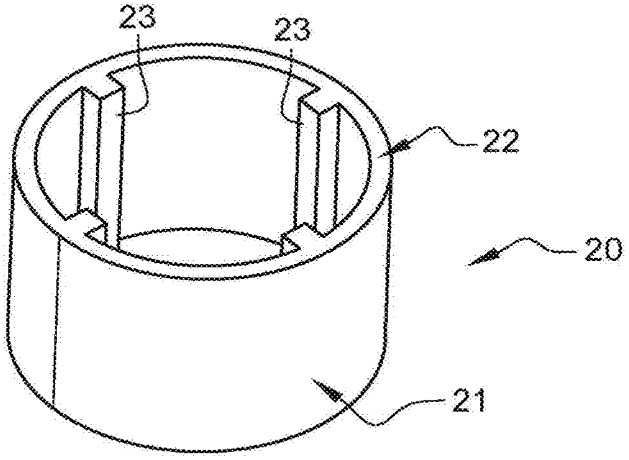
FIGS. 3A and 3B represent schematic perspective views of two embodiments of a vibration damping ring according to the invention.
Figure 3B:
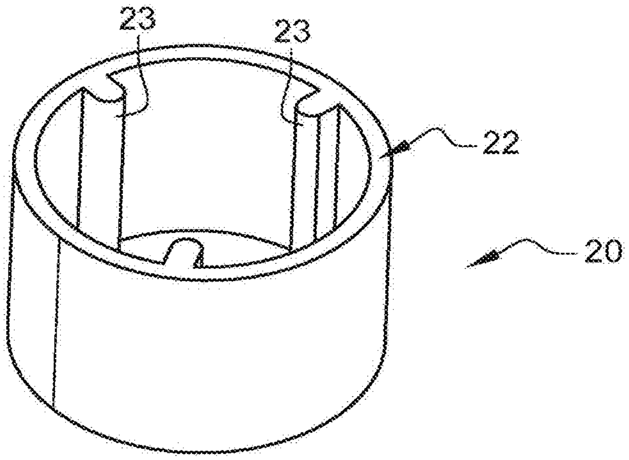

Different examples of a vibration damping ring, also called a damping ring, are represented in a perspective view in parts A and B of FIG. 3. This damping ring 20 includes an external part 21 and an internal part 22, solidly connected to the external part 21. The function of the external part 21 is to rigidify the damping ring 20 and the function of the internal part 22 is to damp vibrations within the vane. The internal part 22 and the external part 21 are secured, for example, by bonding, by overmoulding, or by any other technique enabling two parts made of different materials to be secured together.

According to some embodiments, the external part 21 is a rigid shroud 21, for example made of thin sheet metal, and the internal part 22 is a hollow cylindrical part 22, made of a material which is flexible in relation to the rigid material of the external part 21. "Flexible material" refers to a material whose hardness can be measured by means of the Shore hardness scale, as opposed to a rigid material, such as the material of the rigid shroud, whose hardness is measured by means of the Brinell, Vickers or Rockwell hardness scales. The flexible material of the hollow cylindrical part 22 may, in particular, be an elastomer or a viscoelastic material. This flexible material, for example a viscoelastic material, coats the entire circumference of the internal wall of the rigid shroud 21. In other words, the damping ring 20 is a shroud whose external surface is made of thin sheet metal, or any other material ensuring rigidity to the ring, and whose internal surface is made of a material adapted to absorb vibrations, such as a viscoelastic material. According to the invention, the damping ring 20 is designed to be mounted around a pivot rod, such as the upper pivot rod 14 or the lower pivot rod 17 of a VSV vane. In the remainder of the description, the damping ring 20 will be described in the case where it is mounted around the upper pivot rod 14, it being understood that it may also be mounted around the lower pivot rod 17 or any other pivot rod of a VSV vane.

As previously explained, each bearing of the VSV vane 12 includes a bush 10 or 11 housed in a bore of the casing 3 and solidly connected to said bore. According to the invention, the damping ring 20 is mounted inside the bush 10 or 11.

Figure 4A:
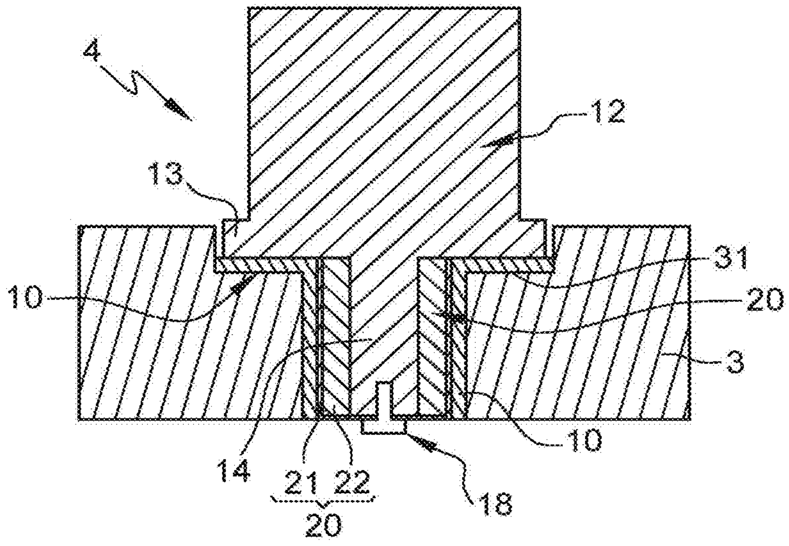
FIGS. 4A, 4B and 4C represent schematic cross-sectional views of two examples of a variable pitch stator vane pivot bearing equipped with the ring of FIG. 3.
Figure 4B:
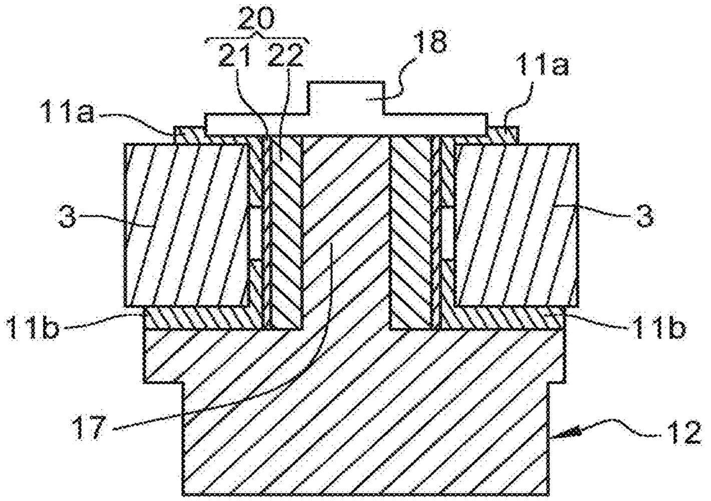
Figure 4C:
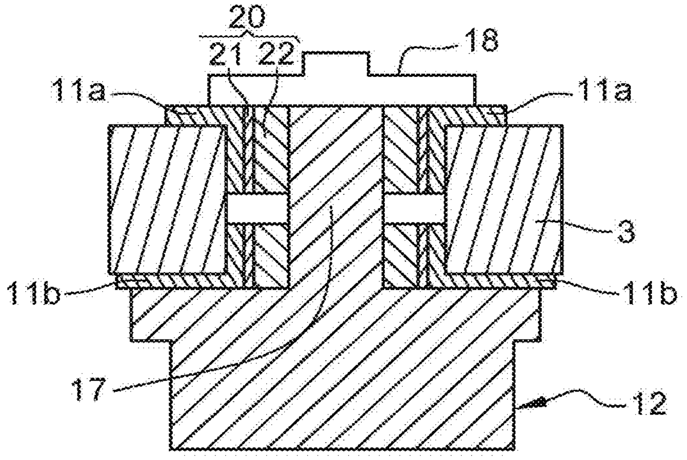

A schematic example of a bearing for the lower pivot of a VSV vane is represented in part A of FIG. 4 and a schematic example of a bearing for the upper pivot of a VSV vane is represented in parts B and C of FIG. 4. Parts A, B and C of this FIG. 4 show a bore 31 in the casing 3 in which the bush 10 and the bush 11 are housed, respectively. The damping ring 20 is mounted around the pivot rod 14 and 17 respectively, the damping ring and pivot rod assembly being mounted inside the bush 10 and 11 respectively. The inner wall of the bush 10 or 11 then forms a friction surface with the rigid shroud 21 of the damping ring 20, thus protecting the pivot rod 14, 17.

To ensure that the damping ring 20 is held in place, and to avoid any risk of fall into the engine, said damping ring can be secured to the VSV vane, for example by means of a screw 18 inserted into the pivot rod 14, 17 at the end of said rod opposite to the blade 12. In some embodiments, the bore 31 of the casing 3 has a shape that allows the damping ring 20 to be held without additional screws.

According to some embodiments, the damping ring 20 has a height substantially equal to the height of the bush, as in the example in part A of FIG. 4. According to other embodiments, the damping ring 20 may extend over the entire length of the pivot rod 17 of the VSV vane, as in the example in part B of FIG. 4, or over only part of said pivot rod, as represented in the example in part C of FIG. 4. In some embodiments (for example, part A of FIG. 4), the bush 10 is a single part housed in the bore 31 of the casing and which itself receives the damping ring 20. In other embodiments (examples in parts B and C of FIG. 4), the bush 11 includes two segments 11*a* and 11*b*, wedged on either side of the pivot rod 17, in the bore 31 of the casing.

According to some embodiments, the damping ring 20 is solidly connected to the pivot rod 14. The damping ring 20 then includes securing means positioned internally in the ring, for example, on the internal face of the hollow cylindrical part 22. In one embodiment, the damping ring 20 includes one or more projecting elements 23, protruding radially from the internal surface of the hollow cylindrical part 22 and extending longitudinally over all or part of the height of the damping ring. Part A of FIG. 3 shows an example of four projecting elements 23 distributed over the internal surface of the hollow cylindrical part 22. In this example, the projecting elements 23 are in the form of rectilinear protrusions, substantially rectangular in cross-section, which extend over the entire height of the hollow cylindrical part 22. Part B of FIG. 3 shows an example of three projecting elements 23 distributed over the internal surface of the hollow cylindrical part 22. In this example, the projecting elements 23 are in the form of rounded protrusions, for example half-cylinders or half-ellipsoids, the cross-section of which is substantially in the shape of a half-disc or a parabola and which extend over at least part of the height of the hollow cylindrical part 22. Of course, it will be understood by the person skilled in the art that the projecting elements 23 can take shapes other than those represented in parts A and B of FIG. 3; they can, for example, have a triangular or square cross-section; they can also extend over only part of the height of the hollow cylindrical part 22. The projecting elements can take all sorts of shapes, whether they are through-shapes or not (that is, over the entire height of the ring or over only part of it), as long as the geometry of these projecting elements makes it possible to rotationally lock the internal, damping part of the ring in relation to the part that allows rotation of the pivot while ensuring resistance to shear stresses. The projecting elements can, for example, be of the key type or of the spline type if the overall size is to be minimised while ensuring the required technical functionality. Any geometry that both enables the parts of the ring to be paired and ensures that these two elements do not rotate over time, taking the operating conditions of the turbomachine into account, can be contemplated, even if, for cost reasons, it may be preferable for the rings to be broached/machined on a mortiser and for the geometry of the projecting elements to be open-ended. The number of projecting elements may also vary: although a single projecting element may be sufficient to secure the damping ring and the pivot rod, it may be preferable for several projecting elements to be distributed over the internal surface of the ring.

Figure 5A:
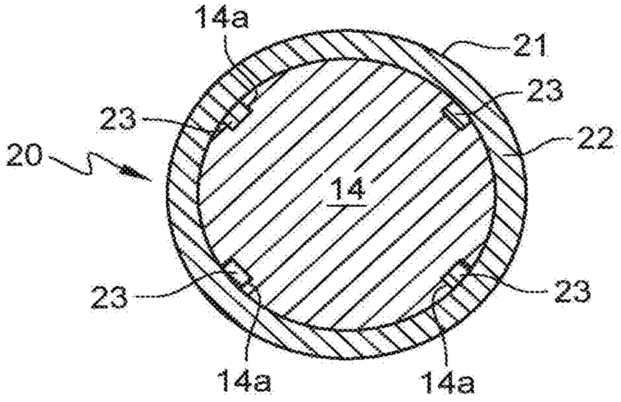
FIGS. 5A and 5B represent top cross-sectional views of two examples of the damping ring of the vibration damping ring around a pivot rod.
Figure 5B:
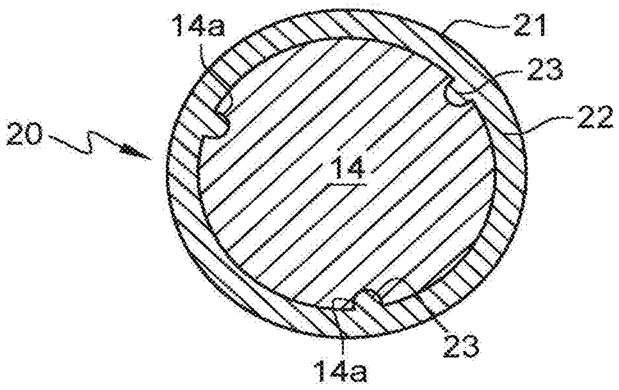

In the embodiments in which the damping ring 20 includes securing means in the form of one or more projecting elements, the pivot rod 14 is then fitted with radial notches 14*a*, adapted to receive the projecting elements 23. These radial notches 14*a* are, for example, of a shape complementary to that of the projecting elements. In example A of FIG. 3, where the projecting elements 23 are rectangular in cross-section, the radial notches 14*a* are in the form of grooves of rectangular cross-section. In example B of FIG. 3, where the projecting elements 23 are semi-cylindrical, the radial notches 14*a* are in the form of grooves of semi-circular cross-section. A cross-sectional view of the damping ring 20 mounted to the pivot rod 14 is represented in part A of FIG. 5, with four projecting elements 23 of rectangular cross-section, engaged in four notches 14*a* of rectangular shape in the pivot rod 14. Another cross-sectional view of the damping ring 20 mounted to the pivot rod 14 is represented in part B of FIG. 5, with three projecting elements 23 of semi-circular cross-section, engaged in three notches 14*a* of semi-circular shape in the pivot rod 14.

According to some embodiments, the rigid shroud 21 may be made of bronze or steel. According to other embodiments, the rigid shroud 21 may be made of titanium. Indeed, titanium has the advantage of keeping its mechanical characteristics at a high temperature (up to approximately 600° C.), while being light. According to an alternative, the rigid shroud 21 may include, on the external wall of the thin sheet metal, a coating, for example a tungsten carbide or graphite lubricating varnish, which improves the friction between the bush and the ring.

The rigid shroud 21, for example made of titanium, is thus compatible with the material of the bush 10; in particular, it is capable of withstanding friction with said bush while withstanding a hot environment (approximately 500°-600° C.). The rigid shroud 21 can thus ensure rotation of the pivot rod of the VSV vane within the bush.

In a preferred embodiment, the material of the hollow cylindrical part 22 is a viscoelastic material adapted to damp vibrations or dissipate mechanical energy and withstand high operating temperatures. This viscoelastic material can be chosen, for example, as a function of the ambient temperature. At low temperatures (up to around 250° C. to 300° C.), the viscoelastic material can be a silicone elastomer (RTV or ecolyte type) or a fluoroelastomer or even a perfluoroelastomer, which have the advantage of being relatively inexpensive. At high temperatures (that is, above 300° C.), the viscoelastic material can be CNT (Carbon Nanotube). CNT is a material made from a network of double- or triple-walled carbon nanotubes, interconnected randomly to each other. This material is therefore particularly light, while having remarkably high mechanical strength (with a theoretical Young's modulus of between 1 and 1.5 TPa), especially in the longitudinal direction, its properties being maintained over a wide thermal range, of between around −196° C. and 1000° C. Because of its structure, CNT is also capable of keeping its flexibility and recovering its initial shape after several deformations.

Thus, under the effect of high-level vibrations, the hollow cylindrical part 22 made of viscoelastic material is capable of successively deforming and then returning to its initial shape, which enables it to at least partially absorb the energy of the vibrations. The hollow cylindrical part 22 is thus capable of damping the vibrations generated within the VSV vane.

The person skilled in the art will therefore understand that with its rigid shroud, for example made of thin sheet metal, and its hollow cylindrical part, for example made of viscoelastic material, the damping ring 20 is capable of damping the vibrations within the vane bearing while allowing rotation of the pivot rod 14, 17 inside the bush 10, 11.

The person skilled in the art will also understand that a damping ring as described previously can be mounted around the pivot rod, at each bearing of the VSV vane. A damping ring 20 may therefore be mounted in the high bearing 5 and/or in the low bearing 4, around the upper pivot rod 14 and/or the lower pivot rod 17, of a VSV vane.

Although described through a number of examples, alternatives and embodiments, the damping ring according to the invention, the vane bearing and the VSV vane comprise various alternatives, modifications and improvements which will be obvious to the person skilled in the art, it being understood that these alternatives, modifications and improvements are within the scope of the invention.

The invention claimed is:

1. An assembly of bearings and turbomachine variable pitch stator vane pivots, each bearing being mounted in a respective bore passing through a casing of the turbomachine and including a respective bush solidly connected to said bore, each turbomachine variable pitch stator vane pivot comprising a lower pivot rod or an upper pivot rod, each lower or upper pivot rod rotating within the respective bore of the casing via the respective bearing, wherein each bearing further includes a ring mounted around and solidly connected to the respective lower or upper pivot rod inside the respective bush, said ring including an external part comprising a rigid material and an internal part solidly connected to the external part and comprising a flexible material wherein the internal part is thicker than the external part, and wherein a fastener, which is a screw, is inserted into the respective lower or upper pivot rod at an end of the respective lower or upper pivot rod that is opposite a vane blade, said fastener being configured to retain the ring axially within the respective bush.

2. The assembly according to claim 1, wherein the external part of the ring includes a rigid shroud and the internal part includes a hollow cylindrical part formed of a material which is flexible in relation to the material of the rigid shroud.

3. The assembly according to claim 2, wherein the material of the hollow cylindrical part is a viscoelastic material.

4. The assembly according to claim 3, wherein the viscoelastic material is CNT.

5. The assembly according to claim 2, wherein the rigid shroud is made of titanium.

6. The assembly according to claim 1, wherein the external part and the internal part are secured by bonding or overmoulding.

7. The assembly according to claim 1, wherein the internal part includes at least one inner securing projection configured to engage radial notches of the pivot rod to secure the ring of each bearing respectively to the lower or upper pivot rod of each variable pitch stator vane pivot.

8. The assembly according to claim 7, wherein the external part of the ring includes a rigid shroud and the internal part includes a hollow cylindrical part formed of a material which is flexible in relation to the material of the rigid shroud, and wherein the at least one inner securing projection is formed of the material of the hollow cylindrical part and extending axially over at least part of the height of said hollow cylindrical part.

9. The assembly according to claim 1, wherein each turbomachine variable pitch stator, comprises a journal for fixing a rod for controlling the setting of the vane and the lower or upper pivot rod intended to be mounted inside the respective casing of the turbomachine.

10. The assembly according to claim 9, wherein the lower or upper pivot rod includes at least one radial notch adapted to receive a projecting element of the ring.

11. The assembly according to claim 9, wherein the ring includes a height between approximately the height of the bush and the height of the variable pitch stator vane pivot.

12. A turbomachine including the assembly according to claim 1.

13. The assembly according to claim 2, wherein the rigid shroud is made of sheet metal.

* * * * *